United States Patent
Krebs (10) Patent No.: US 8,766,660 B2
(45) Date of Patent: Jul. 1, 2014

(54) METHOD OF TESTING SOLAR CELLS

(75) Inventor: Frederik Christian Krebs, Kgs. Lyngby (DK)

(73) Assignee: Technical University of Denmark, Kgs. Lyngby (DK)

( * ) Notice: Subject to any disclaimer, the term of this patent is extended or adjusted under 35 U.S.C. 154(b) by 243 days.

(21) Appl. No.: 13/129,314

(22) PCT Filed: Nov. 18, 2009

(86) PCT No.: PCT/EP2009/065420
§ 371 (c)(1),
(2), (4) Date: Jul. 20, 2011

(87) PCT Pub. No.: WO2010/057935
PCT Pub. Date: May 27, 2010

(65) Prior Publication Data
US 2011/0267090 A1   Nov. 3, 2011

(30) Foreign Application Priority Data

Nov. 19, 2008   (GB) .................................. 0821146.8

(51) Int. Cl.
*G01R 31/26*   (2014.01)
(52) U.S. Cl.
USPC .... 324/761.01; 702/182; 250/205; 250/203.4
(58) Field of Classification Search
CPC ............................ G01R 31/2605; F21S 8/006
USPC .............. 324/761.01, 501; 250/205; 136/206, 136/244
See application file for complete search history.

(56) References Cited

U.S. PATENT DOCUMENTS

| | | | |
|---|---|---|---|
| 4,695,788 A * | 9/1987 | Marshall | 324/527 |
| 4,712,063 A | 12/1987 | Osterwald et al. | |
| 5,217,285 A | 6/1993 | Sopori | |
| 5,623,149 A | 4/1997 | Kilmer | |
| 5,945,839 A | 8/1999 | Hyvarinen | |

(Continued)

FOREIGN PATENT DOCUMENTS

| | | |
|---|---|---|
| CN | 1335513 | 2/2002 |
| CN | 1564013 | 1/2005 |

(Continued)

OTHER PUBLICATIONS

Keith Emery, Handbook of Photovoltaic Science and Engineering, Chapter 16: Measurement and Characterization of Solar Cells and Modules, Jul. 7, 2003, John Wiley & Sons.*

(Continued)

*Primary Examiner* — Huy Q Phan
*Assistant Examiner* — Adam Clarke
(74) *Attorney, Agent, or Firm* — Pillsbury Winthrop Shaw Pittman LLP (57) ABSTRACT

A method of measuring the efficiency with which a solar cell converts incident photons into charge carriers, including the following steps: (a) illuminating the solar cell with a broadband light source; (b) illuminating the solar cell with the broadband light source of which the intensity of a selected range of wavelengths has been reduced; (c) determining the change in the number of photons incident on the cell and the change in the number of charge carriers produced by the cell between steps (a) and (b); and (d) using the changes determined in step (c) to calculate the said efficiency measure.

13 Claims, 11 Drawing Sheets

Linearity and deviation from linearity

(56) References Cited

U.S. PATENT DOCUMENTS

| | | |
|---|---|---|
| 6,154,034 A | 11/2000 | Lovelady et al. |
| 6,590,149 B2 | 7/2003 | Adelhelm |
| 6,639,421 B1 | 10/2003 | Yoshino et al. |
| 6,876,187 B2 | 4/2005 | Matsuyama |
| 7,067,831 B2 | 6/2006 | Ahrens et al. |
| 7,309,850 B2 * | 12/2007 | Sinton et al. ............... 250/203.4 |
| 7,387,405 B2 * | 6/2008 | Ducharme et al. ............ 362/231 |
| 8,239,165 B1 * | 8/2012 | Young et al. .................. 702/182 |
| 2002/0171441 A1 | 11/2002 | Jayamaha |
| 2004/0020529 A1 | 2/2004 | Schutt et al. |
| 2006/0103371 A1 | 5/2006 | Manz |
| 2006/0290344 A1 | 12/2006 | Shimotomai et al. |
| 2008/0088829 A1 * | 4/2008 | Fuyuki .......................... 356/230 |
| 2009/0279277 A1 * | 11/2009 | Jungwirth et al. ................. 362/2 |
| 2010/0276571 A1 * | 11/2010 | Wang et al. ................... 250/205 |
| 2011/0227598 A1 * | 9/2011 | Park et al. ................ 324/761.01 |

FOREIGN PATENT DOCUMENTS

| | | |
|---|---|---|
| CN | 1888518 | 1/2007 |
| DE | 10026162 | 12/2001 |
| GB | 2 038 438 | 7/1980 |
| JP | 11-214165 | 8/1999 |
| JP | 2002-111029 | 4/2002 |
| JP | 2004281706 A * | 10/2004 |

OTHER PUBLICATIONS

International Search Report dated Apr. 14, 2010 in corresponding International Patent Application No. PCT/EP2009/065420.
Ryuichi Shimokawa et al., "Supplementary-Light Method for Measuring the Conversion Efficiency of Multijunction Solar Cells," Japanese Journal of Applied Physics, vol. 28, No. 5, Part 2, pp. L845-L848 (May 1, 2989).
Keith Emery et al., "Spectral Corrections Based on Optical Air Mass," Conference Record of the 29th IEEE Photovoltaic Specialists Conference, vol. Conf. 29, pp. 1725-1728 (May 19, 2002).
Halden Field, "UV-VIS-IR Spectral Responsivity Measurement System for Solar Cells," National Renewable Energy Laboratory (NREL), NREL/CP-520-25654, 8 pages (Nov. 1998).
Oriel QE/IPCE Measurement Kit, Light Sources, Newport.com web page, 1 page.
PV Measurements, Inc.—"I-V Testing Equipment for Solar Cells and Small OV Modules," http://www.pvmeas.com/ivqe.html, 6 pages (Jul. 5, 2008).

* cited by examiner

METHOD OF TESTING SOLAR CELLS

CROSS REFERENCE TO RELATED APPLICATIONS

This application is the National Phase entry of PCT/EP2009/065420, filed Nov. 18, 2009, which claims priority to Great Britain Patent Application No. GB0821146.8, filed Nov. 19, 2008. The content of these applications is incorporated herein by reference in their entirety.

The present invention provides a method of testing a solar cell.

The photovoltaic effect has been known for centuries and applied in solar cells since the 1950s. Solar cells operate by absorbing a photon and converting it into free carriers, which produce an electronic current in an external circuit that can do work. Since the first solar cells based on silicon, several new types of solar cells have emerged that have been termed $2^{nd}$ or $3^{rd}$ generation. The drive towards new solar cell technologies has been the reduction of cost. While all solar cells convert sunlight into electricity, they achieve this in various fundamentally different ways. Two examples belonging to the $3^{rd}$ generation are the Dye sensitized solar cell (DSSC) and the polymer/organic solar cell (OSC).

DSSCs operate by means of a dye accepting a photon to form an excited state, which injects an electron into the conduction band of a wide band gap semiconductor. The electron then diffuses to the electrode and passes through a circuit to the counterelectrode, where it is reduced by an oxidising couple, such as $I^-/I_3^-$. The oxidised dye is regenerated by interaction with the couple. Usually, an organometallic Ru complex is used as the dye, nanoparticulate $TiO_2$ as the semiconductor with the dye adsorbed on the surface of the nanoparticles, and acetonitrile as the electrolyte between the counterelectrode and the $TiO_2$.

It is known that in DSSCs the major transport mechanism for electrons through the $TiO_2$ nanoparticle layer to the electrode is diffusion. The $TiO_2$ conduction band contains trap states, i.e. local energy wells, in increasing density as the energy level approaches the upper edge of the conduction band. Thus, the model applied to describe the diffusion of electrons through $TiO_2$ is a trapping/detrapping model, in which the electron falls into a trap state where it remains until it is thermally activated to escape the trap, then moves to another trap, is thermally activated to escape that trap, and so on until reaching the electrode. The trap states may have a variety of depths of energy well, and so the time for which the electron remains in the trap will vary depending on the amount of thermal energy required to escape, or alternatively on the likelihood of an incident photon being of the required energy to allow the electron to escape. In addition, the response of such devices to light is often not linear with respect to the incident wavelength and the incident intensity of the light.

Figure 1:
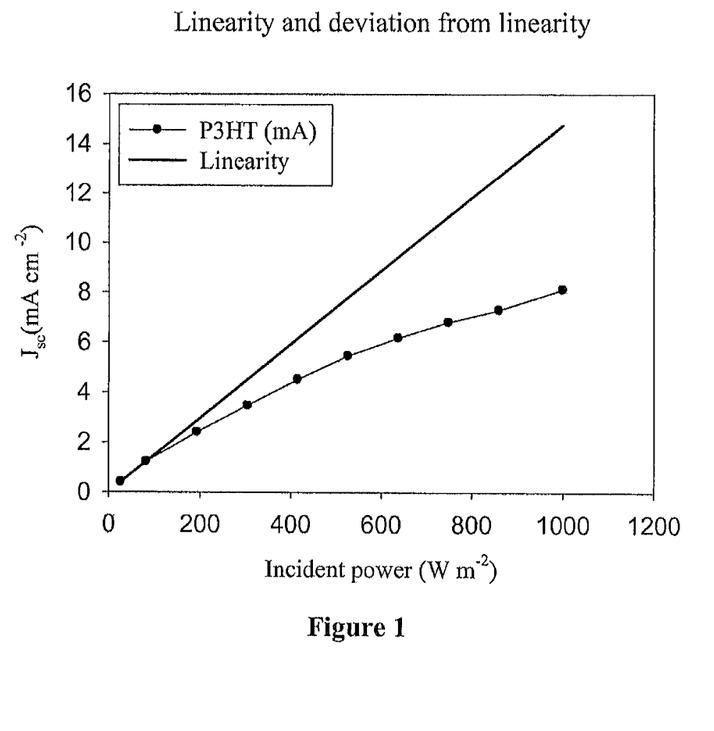
FIG. 1 shows the deviation from linearity of the response of an organic solar cell to changes in the incident light intensity.

OSCs typically comprise a mixture of an electron donor and an electron acceptor component that may be polymers, small molecules or a fullerene derivative. They operate by light absorption and exciton dissociation through electron transfer from the donor component to the acceptor component. The separate transport of the charge carriers (electrons and holes) to the separate electrodes relies on a complex interplay between molecular organization, phase separation of the donor and acceptor components, nanomorphology and charge selective layers at the interfaces between the bulk of the material and the electrodes. The response of the device to incoming light is dependent on the light energy, and is frequently not linear with respect to the incident wavelength or the incident intensity, as can be seen from FIG. 1 in which the deviation from linearity of the response of an organic solar cell to changing light intensity is shown.

The power conversion efficiency of solar cells is most reliably measured using the sun as the source of light. The exception to this is for laboratory scale solar cells that are most often characterized using a light source other than the sun. It can also be an advantage to have a different light source if the solar cell is intended for a particular lighting condition (i.e. indoor, low light etc.). From this point of view the use of a programmable light source that to a certain extent can synthesize the desired irradiance spectrum is advantageous.

The use of a light source comprising a matrix of solid state radiation sources, preferably LEDs, is described in Schutt et al (US 2004/0020529). It is disclosed therein that a matrix of LEDs having different spectral emmission characteristics may be used to simulate a chosen broadband spectrum.

A standard measure of the efficiency of solar cells is the incident photon to charge carrier efficiency (IPCE). This measure determines the ratio of the number of photons that generate electrons in the external circuit to the total number of incident photons of monochromatic light. It may be calculated from the power density of monochromatic light incident on the cell $P_{in}$ (in $Wm^{-2}$), the wavelength of that light $\lambda$ (in m), and the short circuit current density $J_{SC}$ (in $Am^{-2}$) from the following equation:

$$IPCE = 100 \frac{\text{current(electrons} \cdot s^{-1} \cdot m^{-2})}{\text{light(photons} \cdot s^{-1} \cdot m^{-2})} \% = 100 \frac{J_{SC} hc}{eP_{in}\lambda}\%.$$

Thus, the measurement is usually carried out using an apparatus which shines monochromatic light of known wavelength $\lambda$ on to the cell, measures the incident power density $P_{in}$ and the short circuit current of the cell, and calculates the IPCE value therefrom. In order to produce monochromatic light, a tunable laser or a broadband light source with a grating or monochromator is required.

Ideally one should be able to use an IPCE curve to calculate the maximum current that a given solar cell will produce under illumination with a given irradiance spectrum. In practical terms this does not work well for the new generation of solar cells such as polymer solar cells (OSCs) and DSSCs, and it is generally accepted that IPCE measurement will give an efficiency measure at the chosen single wavelength and intensity for the conversion of light into electricity for a given device, but that the value obtained cannot be used reliably for predicting performance under different lighting conditions, even where the same wavelength of light is used at a different intensity.

When measuring IPCE for an OSC it is often found that the use of the IPCE spectrum to predict the electrical current produced by the cell under illumination with a white light source lead to overestimation of the total electrical current due to the abovementioned non-linearity of the response of the device with respect to wavelength and intensity.

When measuring IPCE for a DSSC, it is found that the use of monochromatic light means that the likelihood of an electron successfully escaping each of the traps it encounters in the $TiO_2$ layer on its route to the electrode is significantly reduced, and thus the IPCE is no longer a reliable indicator of the efficiency of the cell. It is therefore usual to irradiate the cell with a low-intensity white light spectrum in addition to a higher intensity wavelength of interest in order to promote the diffusion of electrons through the $TiO_2$ layer. This requires the use of a separate broadband light source in addition to the source of monochromatic light. As for the measurement of IPCE for OSCs, above, the value of IPCE obtained by this method cannot be used reliably for predicting performance of a DSSC under different lighting conditions due to the above-mentioned non-linearity of response of the cell with respect to wavelength and intensity of the incident light.

The present inventor has devised an alternative method of measuring IPCE, and the efficiency with which incident photons are converted to charge carriers in general, for solar cells, in particular DSSCs and OSCs, which may be conducted with a single light source, and which involves illuminating the cell to be tested with a broadband light source, of which the intensity of a selected narrow range of wavelengths is reduced, and comparing the number of charge carriers produced and the number of photons incident on the cell obtained with those obtained when the cell is illuminated with the unmodified broadband source. This comparison gives rise to the same information as the standard IPCE measurement described above.

More specifically, the present invention provides a method of measuring the efficiency with which a solar cell converts incident photons into charge carriers, comprising the following steps:
(a) illuminating the solar cell with a broadband light source;
(b) illuminating the solar cell with the broadband light source of which the intensity of a selected range of wavelengths has been reduced;
(c) determining the change in the number of photons incident on the cell and the change in the number of charge carriers produced by the cell between steps (a) and (b); and
(d) using the changes determined in step (c) to calculate the said efficiency measure.

In particular, for measuring IPCE, the method comprises in step (c), determining the change in the number of incident photons as the change in intensity $P_{in}$ between steps (a) and (b), and the change in the number of charge carriers as the change in short circuit current density $J_{SC}$ between steps (a) and (b), and in step (d), using the values of $P_{in}$ and $J_{SC}$ to calculate a value of IPCE.

By using the irradiance spectrum under which the solar cell is intended to operate (intensity and spectral distribution) a synthesized light source allows for the accurate determination of the IPCE under the operating conditions by selectively reducing the intensity of a narrow range of wavelengths and measuring the difference in generated current as a function of the decrease in incident light. This can be viewed as an inverse approach to IPCE and it shall be termed herein "inverse IPCE".

One advantage of the inverse IPCE method is that the conditions of measurement are very close to the intended operating conditions, and so the measurement obtained may more closely reflect the actual efficiency of the device under the intended operating conditions.

For DSSCs, a further advantage is obtained since, as the perturbation to the broadband spectrum is minimised, this method allows electron diffusion through the $TiO_2$ with a level of efficiency as expected for use under normal conditions, and thus a better indication of the actual efficiency of the device than the use of conventional IPCE measurement methods.

In certain aspects, it is preferred to conduct the method of the present invention such that step (c) is conducted by:
(i) measuring the intensity $P_{in,1}$ of the broadband light source in step (a) and the intensity $P_{in,2}$ of the broadband light source of which the intensity of a selected range of wavelengths has been reduced in step (b);
(ii) measuring the short circuit current density $J_{SC,1}$ of the solar cell when illuminated by the broadband light source in step (a) and the short circuit current density $J_{SC,2}$ of the solar cell when illuminated by the broadband light source of which the intensity of a selected range of wavelengths has been reduced in step (b);
(iii) comparing the values of $P_{in,1}$ with $P_{in,2}$ and $J_{SC,1}$ with $J_{SC,2}$ in order to arrive at the values of $P_{in}$ and $J_{SC}$ due to the change in intensity of the selected wavelength range.

In this case, the equation used to calculate IPCE in step (d) may suitably be:

$$IPCE = 100\frac{(J_{SC,1} - J_{SC,2})hc}{e(P_{in,1} - P_{in,2})\lambda}\%,$$

wherein $\lambda$ is the wavelength at the midpoint of the selected range of wavelengths of step (b).

However, in alternative aspects, in particular where the response of the device to the change in lighting conditions between step (a) and step (b) is small, it is preferred to conduct the method of the present invention such that the intensity of the selected range of wavelengths in step (b) is modulated using a selected waveform at a selected frequency, and step (c) is conducted by determining the modulated light intensity function $P_{in,m}$ and the corresponding modulated short circuit current density function $J_{SC,m}$. In this case, the equation used to calculate IPCE in step (d) may suitably be:

$$IPCE = 100\frac{J_{SC,m}hc}{eP_{in,m}\lambda}\%,$$

wherein $\lambda$ is the wavelength at the midpoint of the selected range of wavelengths of step (b).

Preferably, the method is conducted using a light source for which the intensity of a range of different wavelengths can be reduced in narrow ranges, or, more preferably, individually, in order that IPCE measurements can be conducted at a number of different wavelengths. Such a light source could be a source capable of simulating the solar spectrum, or the characteristics of light produces by indoor light from fluorescent lamps, arc lamps, or incandescent lamps.

Suitably, this may be achieved by the use of a filter to block (partially or wholly) each of the selected ranges of wavelengths, or single wavelengths, in turn. However, this is not preferred as it is difficult and expensive to obtain a filter that will selectively reduce the intensity of a narrow range of wavelengths or a single wavelength from a spectrum without affecting the intensities of the neighbouring wavelengths. If the neighbouring wavelengths are affected, then each measurement taken with each filter cannot accurately be compared with the measurement taken using the unmodified broadband spectrum (i.e. in the absence of any filter) as the intensities of these neighbouring wavelengths will be different from the intensity in the absence of the filter, and may therefore affect the current output of the cell.

More preferably, therefore, the light source comprises an array of light sources each having a narrow bandwidth. Preferably, the intensity of each of the light sources in the array can be individually controlled, in order to simulate a desired broadband spectrum reflecting the intended operating conditions of the device to be tested. Suitably, the broadband source comprises an array of light sources providing light of different wavelength ranges, and the intensity of the selected wavelength range is reduced by switching off the light sources providing light of the selected wavelength range. Preferably, however, the broadband source comprises an array of light sources providing light of different wavelength ranges, and the intensity of the selected wavelength range is reduced by reducing the intensity of the light sources providing light of the selected wavelength range, in order that the spectrum used to conduct the measurement is as similar as possible to the spectrum under which the device is intended to operate. This increases the accuracy of the IPCE measurement and its applicability in predicting the behaviour of the device under different lighting conditions. Preferably, the reduction in intensity of the selected wavelength range in step (d) is to 50% of the intensity of the selected wavelength range in step (a), more preferably 75% of the intensity of the selected wavelength range in step (a), more preferably 90% of the intensity of the selected wavelength range in step (a), and most preferably 95% of the intensity of the selected wavelength range in step (a).

Suitably, this can be achieved by using an array of light-emitting diodes (LEDs) chosen carefully with different wavelength ranges. The light intensity of an LED is proportional to the current input, and so the light intensity can easily be varied. The practical FWHM bandwidth that can be readily achieved by each LED is in the 10-50 nm range, depending on the wavelength of the particular LED. Such a light source allows for synthesis of various irradiance spectra. In addition, it allows for the selective intensity reduction of light having a selected narrow range of wavelengths. This has advantages for the measurement of solar cell performance. Preferably, the selected wavelength range has a maximum FWHM range of 50 nm and more preferably, the selected wavelength range excluded from the broadband source has a maximum FWHM range of 40 nm.

Alternatively, the light source may be an array of tunable lasers each providing a different wavelength or range of wavelengths of light, an array of sources of monochromatised white light, or a combination of any or all of the sources mentioned herein.

Figure 2:
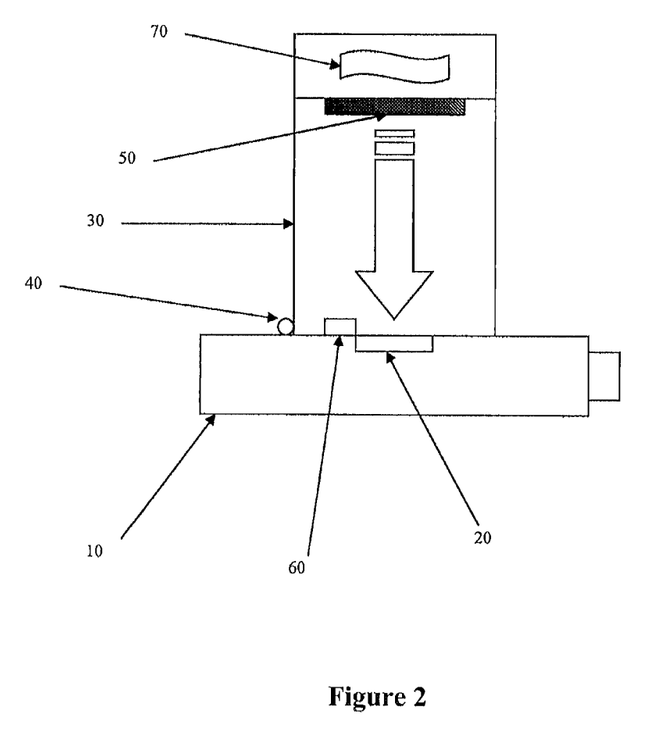
FIG. 2 shows schematically an apparatus for carrying out the method of the present invention.

Referring to FIG. 2, this Figure shows schematically an apparatus of a type suitable for carrying out the method of the present invention. The apparatus 1 comprises a base plate 10 which provides the support for a sample holder 20, and enclosure 30 which covers the sample holder 20. Enclosure 30 is attached to base plate 10 by means of hinge 40, in order that the enclosure may be moved to provide access to sample holder 20 and the internal components of enclosure 30. It will be appreciated that other means of moving the enclosure and/or its contents to provide access to the sample holder may be used, such as pivotal movement in the plane of the base plate 10, or translational movement in the plane of base plate 10 or perpendicular to it. In an upper part of enclosure 30, positioned directly above sample holder 20, is provided light source 50. Light source 50 is positioned to illuminate, in use, a solar cell placed in sample holder 20, and also to illuminate, in use, one or more light detector areas 60 provided in the base plate adjacent the sample holder 20. Light detector area 60 is in communication with light detectors (not shown) such as photodiodes provided either in the base plate 10 or as separate components which measure the power of the incident light, and an optical fibre that transmits the incident light to a spectrum analyser. It will be appreciated that the photodiodes and the optical fibre may be positioned in different areas of base plate 10, as can be seen from FIG. 8 in which photodiodes 560 and 570 are positioned on one side of the sample holder, and optical fibre 580 on the opposite side. The position of the light detector area(s) 60 and sample holder 20 in a fixed orientation with respect to the light source 50 permits self-calibration of the device, and ensures that measurements made using the device are reproducible. Above light source 50 in enclosure 30 is provided cooling means 70, such as a fan cooling unit and/or a water cooling unit. The electronics required to control the light source 50 and cooling means 70 may be provided separately, and are not shown in this Figure.

Figure 3:
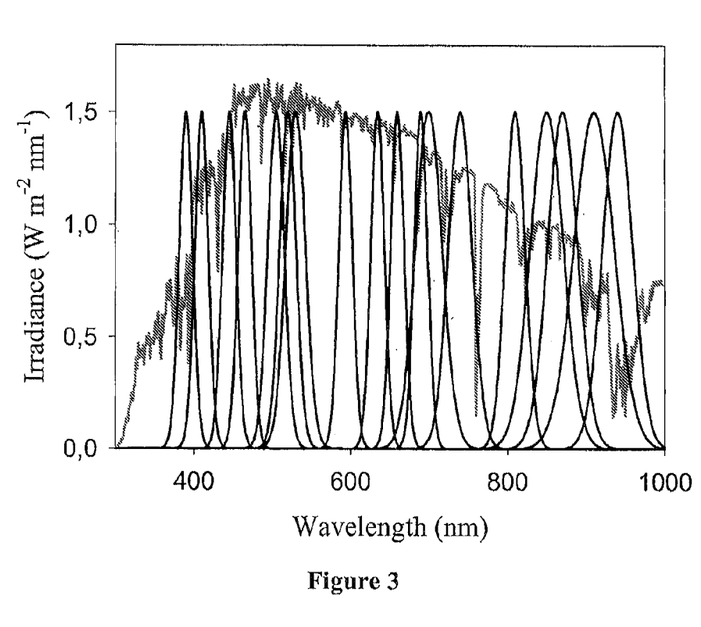
FIG. 3 shows the AM1.5G solar irradiance spectrum at an overall intensity of 1 sun along with the normalized emission spectra for the diodes in an array that may be used in the method of the present invention.
Figure 4:
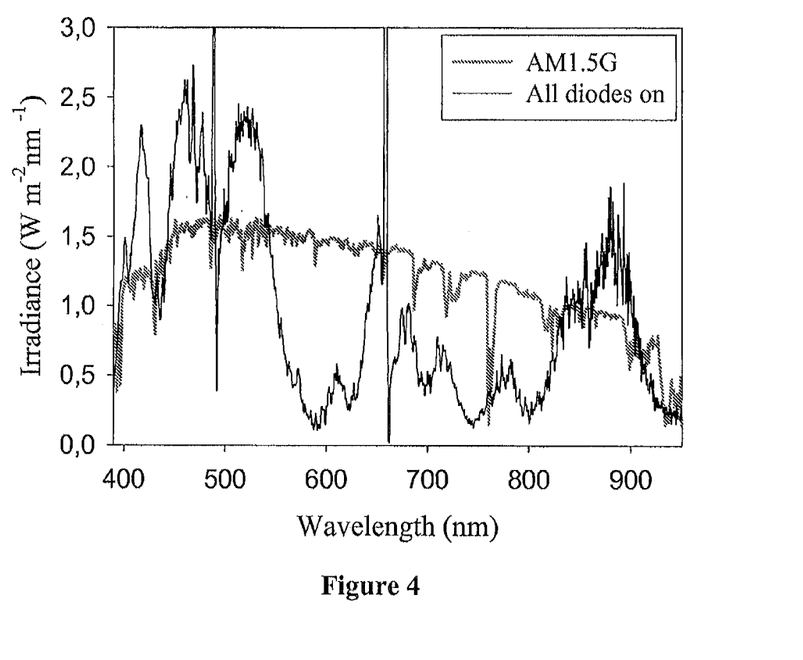
FIG. 4 shows a comparison of the AM1.5G spectrum with the resulting spectrum from the diode array of FIG. 3 with all diodes operating at half the maximum intensity. The distance from the source to the active layer of the device is is 55 mm.
Figure 5:
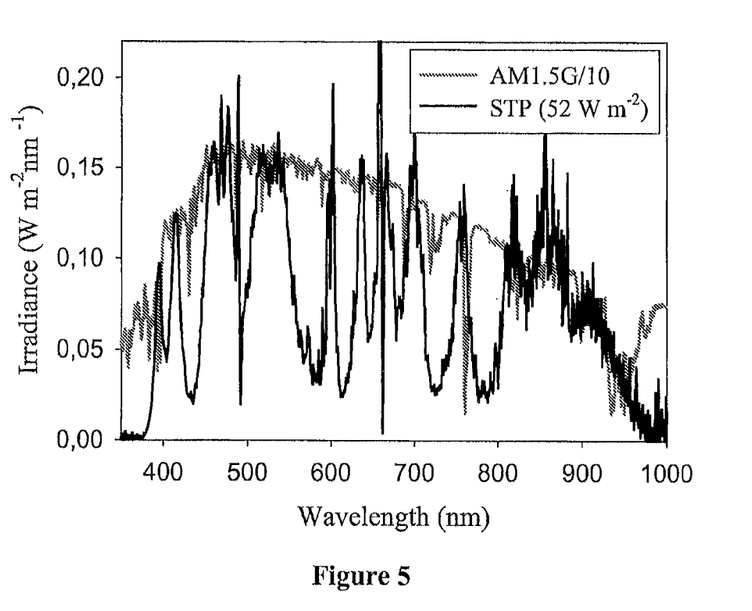
FIG. 5 shows a comparison of the AM1.5G spectrum at 0.1 suns with the resulting spectrum from the diode array of FIG. 3 tuned to replicate the characteristics of the solar spectrum.

Light source 50 is made up of an array of LED light sources, each providing a narrow wavelength range of light in the UV-vis-NIR range of the spectrum. An example of the normalised emission spectrum for each diode in the array is shown in FIG. 3. As may be seen, diodes having a narrow wavelength range centred on 390 nm, 410 nm, 445 nm, 465 nm, 505 nm, 520 nm, 390 nm, 410 nm, 445 nm, 465 nm, 505 nm, 520 nm, 530 nm, 595 nm, 635 nm, 660 nm, 690 nm, 700 nm, 740 nm, 810 nm, 850 nm, 870 nm, 910 nm and 940 nm form a light source together producing a light spectrum covering the majority of the visible solar spectrum. The overall effect of the array of diodes is shown in FIG. 4 as a comparison with the AM1.5G spectrum at an intensity of 1 sun, which is the standard spectrum used in IPCE measurement. The overall intensity of the spectrum in this wavelength range (i.e. 390-940 nm) is 660 Wm$^{-2}$, and is approximately equal to the overall intensity of solar radiation in this wavelength range (around 670 Wm$^{-2}$). The LEDs may be individually controlled using appropriate software, in order that they may each be switched on or off, and may produce a selected intensity of illumination. Thus, the overall resulting spectrum produced by the LED array may be tailored to reproduce chosen testing conditions, both with differing wavelength ranges and differing intensities of light at particular wavelength ranges. For example, FIG. 5 shows a spectrum having an overall intensity of 52 Wm$^{-2}$ tailored to reproduce the characteristics of the AM 1.5 G solar spectrum at an intensity of 0.1 suns (=67 Wm$^{-2}$ over the wavelength range of interest).

Individual control of diodes in the array allows IPCE and inverse IPCE measurements to be made. LEDs also provide high temperature stability and broad emission angles (110-120°). Use of a high stability emitter allows the light source to be classified as a Class AAA sun simulator. High power LEDs are preferably used in order that light intensity levels from 1 $Wm^{-2}$ to 6000 $Wm^{-2}$ can be produced for testing of solar cell devices.

Figure 6:
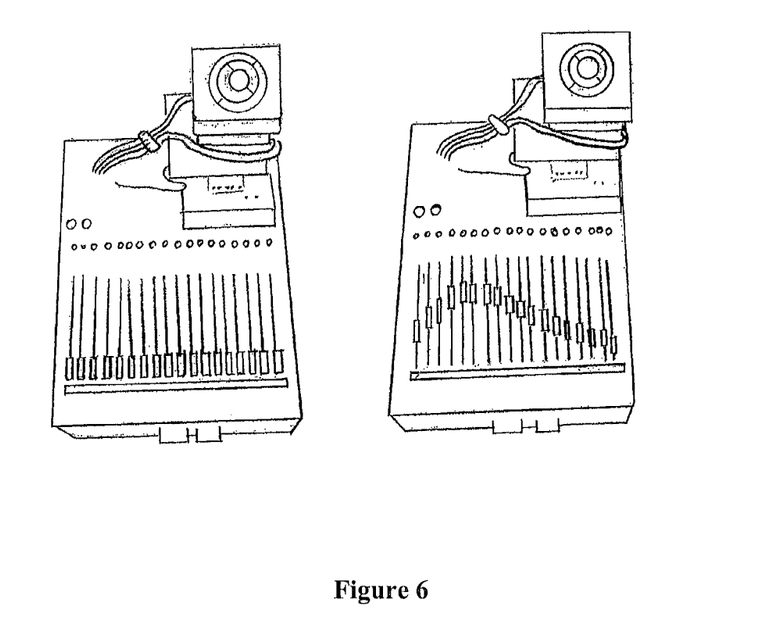
FIG. 6 shows a line drawing of an apparatus for carrying out the method of the present invention.

FIG. 6 presents two line drawings showing from above a prototype apparatus corresponding to that shown schematically in FIG. 2, with the exception of enclosure 30. The left-hand line drawing shows the apparatus with the light source switched off, and the right-hand line drawing with the light source switched on. At the bottom of the line drawings are seen the control switches for each of the LEDs making up light source 50; the current provided to each, and hence the intensity of each LED, may be controlled using these switches and sliding potentiometers. Modulation of the spectrum produced by the light source may be carried out in real time using such an apparatus. Alternatively, computer control of the intensity of each LED may be substituted. On the upper right of the line drawings is the stack of components including the base plate 10, sample holder 20, measurement window 60, light source 50 and cooling means 70. In contrast to the apparatus of FIG. 2, the light source and cooling means are pivotally mounted over the base plate in order that the light source and cooling means may be swung away from the sample holder for easy access thereto.

Figure 7:
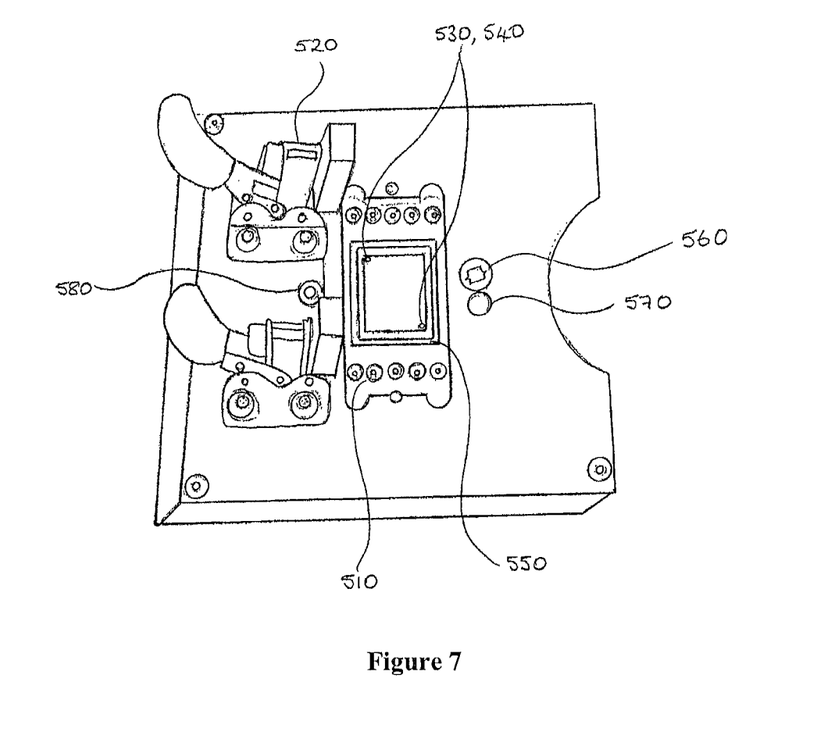
FIG. 7 shows a line drawing of the sample holder and detection window of the apparatus of FIG. 6.

Referring to FIG. 7, this Figure presents a line drawing of the base plate 10 from above, showing the sample holder 20 and the light detection areas 60. Sample holder 20 includes spring-loaded electrical contacts for a sample device, such that four-point electrical measurements can be made to eliminate ohmic losses, as is known in the art. Light detection areas 60 include optical fibre coupling, so that the emission spectrum can be monitored continuously through the optical fibre, and photodiodes to monitor the intensity of the incident light. It can be seen from the Figure that the sample holder comprises two sets of spring loaded gold contacts 510, and a corresponding pair of clamps 520 to hold the sample firmly against contacts 510. In addition, the sample holder comprises a well, positioned in order that it will be below the active area of the sample device in use, having a gas inlet 530 and outlet 540, and a rubber gasket or other sealing means 550. It is possible to adapt the sample holder to accommodate more than one sample device, in order that simultaneous testing of a number of devices may be conducted under identical conditions.

The device characteristics and spectral characteristics of the light source may suitably be recorded and/or analysed using components known to the skilled person. Suitable components would be a Keithley source meter, eg Keithley 2400, for the electrical characteristics of the device and a spectrum analyser such as an Avaspec-2048 from Avantes for measuring the spectral characteristics. Further, the output of such a component may be processed using suitable software in order to determine IV-characteristics, the linearity of response of a device to different wavelengths of light, saturation, power conversion efficiency (PCE), IPCE, inverse IPCE, and stability and/or degradation and/or lifetime measurements. In addition, measurements can be performed under a range of light intensity conditions.

The apparatus described here can conduct all the conventional measurements used in the testing of a solar cell on a single platform, i.e. without the need to move the solar cell from one testing apparatus to another between measurements. Thus, the environmental variables that affect such measurements may be kept constant, increasing the accuracy of the measurements.

In use, the enclosure 30 is moved into an open position in order to provide access to sample holder 20. A sample device, such as a polymer solar cell, is placed on the sample holder 20 such that it is placed in contact with the elecrical contacts of the sample holder. As shown in FIG. 7, clamps are fastened across the sample device to hold it against contacts 510 and rubber gasket 550 in order that electrical contact is made and the well under the sample device is sealed. A selected atmosphere may then be provided under the sample by means of the gas inlet and outlet 530 and 540, without the need to provide a separate gas chamber. Enclosure 30 is then moved into a closed position covering the sample holder. This enclosure thus protects the sample, light detector area(s) 60 and light source 50 from damage, and also shields the user from exposure to the very intense light produced by the light source. As an optional additional safety measure, the enclosure 30 and base plate 10 may be adapted so that the enclosure 30 must be in its closed position before it is possible to switch on the light source 50.

Once enclosure 30 is moved to its closed position, the light source 50 and cooling means 70 may be switched on. The light from light source 50 illuminates the light detector area (s) 60 and the sample on sample holder 20. A portion of the light incident on light detector area(s) 60 is conducted by means of an optical fibre 580 or other suitable means to a spectrum analyser. In addition, a portion of the light incident on light detector area(s) 60 is detected by diodes 560 and 570 (such as Hamamatsu 51133 and Hamamatsu 55971 diodes) that measure the intensity of the incident light. It is possible to adjust the spectrum produced by light source 50 to more closely reflect a desired spectrum for use in testing, for example the AM1.5G standard, by altering the current provided to each LED to adjust its intensity, for example by using a computer controlled or manual multichannel power supply.

A self calibration may then be carried out by the apparatus by means of detection of the spectral characteristics and intensity of the incident light under varying conditions imposed by the computer controlled multichannel power supply.

Figure 8:
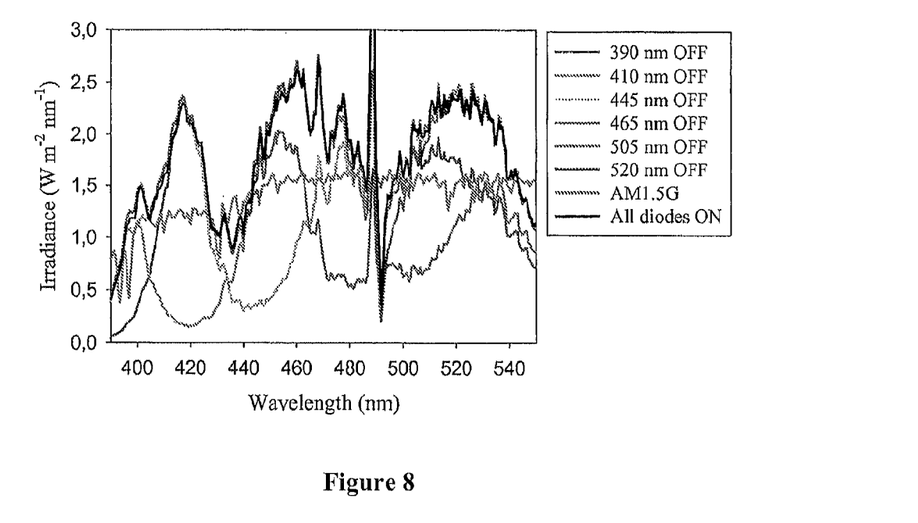
FIG. 8 shows the alteration to the spectrum of FIG. 5 by switching off individual diodes in the array.

The testing of the sample may then commence, with the current and voltage response of the sample in the chosen lighting conditions being monitored by a suitable apparatus, such as a Keithley source meter, connected to the contacts of the sample holder, and recorded and manipulated by suitable software. All of the conventional tests for solar cells may be conducted on this apparatus, such as I/V response, saturation, conventional IPCE, and stability, lifetime and degradation measurements, in the known manner. In addition, the inverse IPCE method of the present invention may also be conducted, as follows:

The sample device is illuminated using a chosen broadband spectrum of light produced by the light source 50. The power density $P_{in,1}$ of the light incident on the device and the short circuit current density $J_{SC,1}$ of the device are measured. Then, the device is illuminated again with the same spectrum of light, except that the intensity of a selected narrow wavelength range is reduced by reducing the current supplied to, or switching off, one of the LEDs in the array that forms light source 50. The effect on the overall spectrum of the light incident on the device is shown in FIG. 8 for a selection of wavelengths for which the intensity is reduced to zero. Once again, the power density of the incident light $P_{in,2}$ and the short circuit current density produced by the device $J_{SC,2}$ are measured, and the wavelength range for which the intensity is reduced is recorded. From these measurements, it is possible to calculate the power density due to the reduction in intensity alone by subtracting the power density measured while reducing the intensity of the wavelength range from the power density measured with the original chosen spectrum, and to calculate the difference in the short circuit current density produced when the intensity is reduced for the selected wavelength range. This gives the values for $P_{in}$ and $J_{SC}$ used in the expression $$IPCE = 100\frac{J_{SC}hc}{eP_{in}\lambda}\%,$$

in which $\lambda$ is the centre of the reduced-intensity wavelength range.

The measurements can be conducted by reducing the intensity of the selected wavelength range by any chosen amount; for example, the intensity may be reduced to zero, to 30% of its original intensity, 40% of its original intensity, 50% of its original intensity, 60% of its original intensity, 70% of its original intensity, 80% of its original intensity, 90% of its original intensity, 95% of its original intensity, or 99% of its original intensity. In order that the measurement is conducted under conditions as close as possible to those under which it is to be operated, it is preferred to reduce the intensity of the selected wavelength range as little as possible from the original intensity value.

Where the response of the device to the selected wavelength range is small, for example at wavelengths at which the device response is poor, or where the device has a very small active area, greater measurement sensitivity may be achieved by imposing a chosen waveform on the intensity of the reduced-intensity wavelength range. For example, the intensity of the reduced-intensity wavelength range may be varied about a midpoint in the form of a sinusoidal wave, square wave, triangular sawtooth waveform, etc, having a known frequency. Thus, $P_{in,m}$, the intensity at the reduced-intensity wavelength, is a function varying with a known frequency, and $J_{SC,m}$, the short circuit current density produced by the device in response to the to the light at the reduced-intensity wavelength is a function varying with the same frequency in phase with $P_{in,m}$. This allows a lock-in amplifier to be used to pick out $J_{sc,m}$, by detection of the frequency at which the intensity varies according to $P_{in,m}$. This permits any background noise to be excluded from the measurements and allows a change in $J_{sc}$ that is small compared with the absolute value of short circuit current density produced under the two sets of lighting conditions to be accurately determined. The functions $P_{in,m}$ and $J_{SC,m}$ can be used to determine IPCE according to the formula given above. As the two functions are in phase, it is possible to use the whole function, the rms value of each function, the peak value of each function, etc, in the formula.

Once all of the required measurements have been conducted on the sample device, the lamp and cooling means may be switched off, the enclosure opened and the sample device removed from the sample holder.

EXAMPLE

A solar cell of the composition glass/ITO/PEDOT/P3HT:PCBM/Al having an active area of 1 cm$^2$ is placed in the sample holder of the device depicted in FIG. 6. Irradiation of the solar cell with the full simulated spectrum as shown in FIG. 4, having an intensity of 660 Wm$^{-2}$, and recording the short circuit current density resulted in a $J_{SC}$ value of 8.25 mAcm$^{-2}$. IPCE measurements were then conducted by the conventional method and by the inverse IPCE method of the invention for comparison. The properties of the LEDs used as the light source in this Example are shown in the table below:

| Wavelength (nm) | Total optical output (mW) | FWHM bandwidth (nm) |
|---|---|---|
| 390 | 700 | 20 |
| 410 | 840 | 20 |
| 445 | 1050 | 20 |
| 465 | 1050 | 20 |
| 505 | 1050 | 25 |
| 520 | 525 | 25 |
| 530 | 525 | 30 |
| 595 | 1050 | 20 |
| 635 | 1050 | 20 |
| 660 | 1050 | 20 |
| 690 | 420 | 22 |
| 700 | 168 | 40 |
| 740 | 168 | 35 |
| 810 | 560 | 30 |
| 850 | 392 | 50 |

Conventional IPCE Measurement

Figure 9:
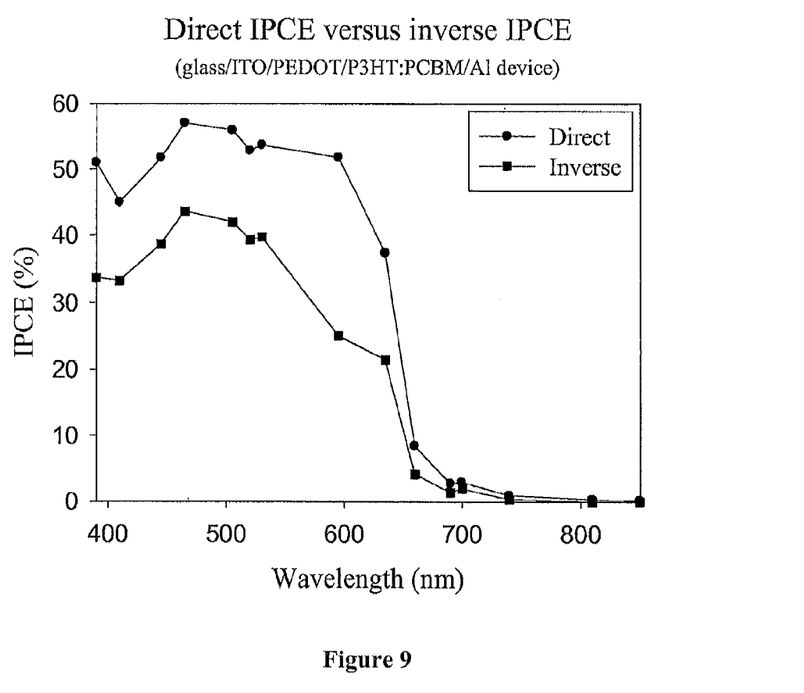
FIG. 9 shows a comparison between the results obtained for a polymer solar cell when IPCE measurements are carried out conventionally and by the inverse IPCE method of the invention.
Figure 10:
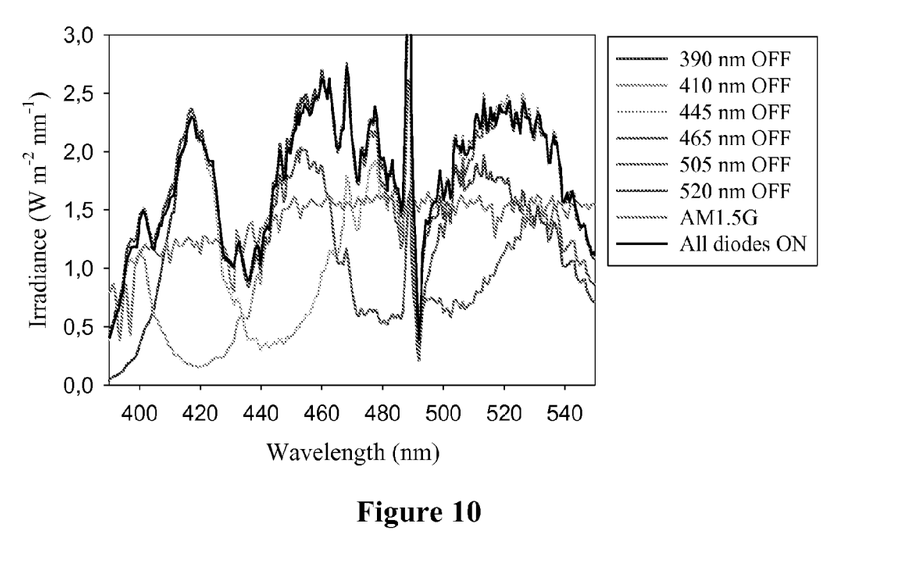
Figure 11:
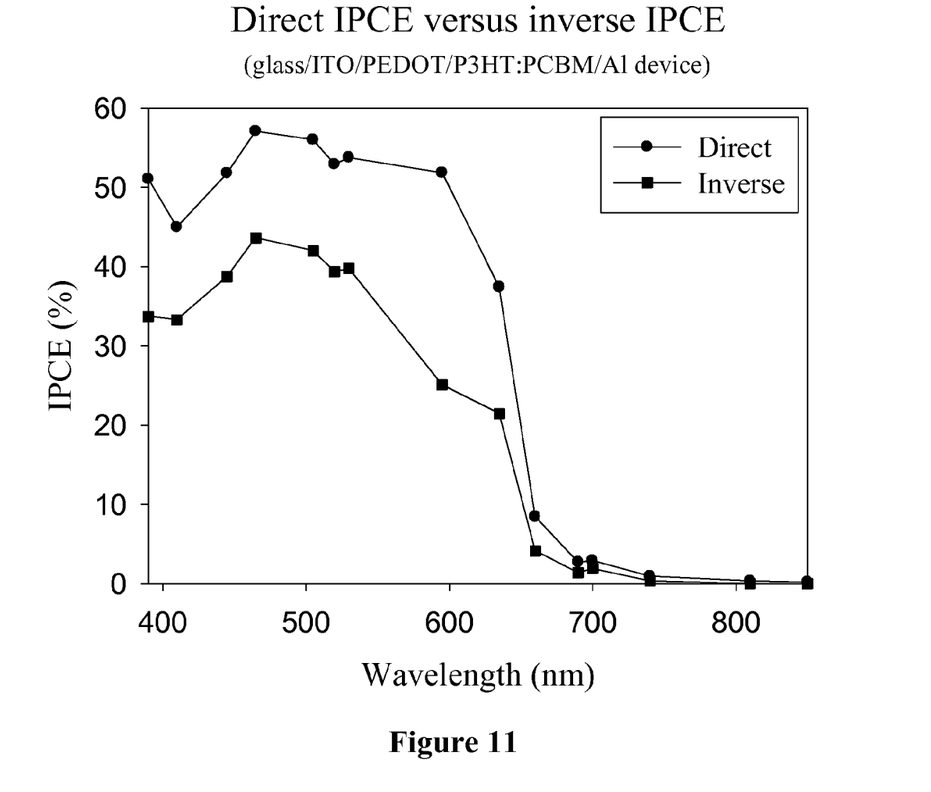

In order to conduct the conventional IPCE measurement, the sample device was illuminated using each of the LEDs in turn. The incident light power $P_{in}$ and the short circuit current density were recorded for each LED and the IPCE value calculated therefrom for each wavelength. The results are recorded in FIG. 9 as the points marked with circles (●).

Inverse IPCE Measurement

In order to conduct the inverse IPCE measurement, the intensity of the full simulated spectrum was maintained at 660 Wm$^{-2}$, except that the intensity of one LED was reduced to zero. This was repeated in turn for all 14 additional LEDs. The incident light power and the short circuit current density were recorded under these conditions, compared with the values obtained under illumination with the full spectrum, and the IPCE values calculated therefrom for each of the chosen wavelengths. The results are recorded in FIG. 9 as the points marked with squares (■).

Once the IPCE values at each wavelength have been determined and plotted on a graph, it is possible using the formula for IPCE given previously to calculate therefrom the predicted value of the short circuit current density for the device illuminated by the full spectrum, and to compare this with the measured value to indicate the accuracy of the IPCE determination. The calculated short circuit current based on the conventional IPCE data gave a value of 10.6 mAcm$^{-2}$, thus overestimating the current by approximately 30% (the typically observed overestimation is in the 20-60% range). When using the inverse IPCE data a value of 7.5 mAcm$^{-2}$ is obtained, which underestimates the current by 10%.

It is expected that by reducing the intensity of the individual wavelengths by less than 100%, an accuracy of ±1% could be achieved, in terms of the agreement between the measured and calculated values of $J_{SC}$, depending on the photosensitivity of the device.

The invention claimed is:

1. A method of measuring incident photon to charge carrier efficiency (IPCE) of a solar cell, comprising the following steps:
    (a) illuminating the solar cell with a broadband light source;
    (b) illuminating the solar cell with the broadband light source of which the intensity of a selected range of wavelengths has been reduced;
    (c) determining a change in a number of photons incident on the solar cell and a change in a number of charge carriers produced by the solar cell between steps (a) and (b), wherein the change in the number of incident photons is determined as a change in intensity, Pin, between steps (a) and (b), and the change in the number of charge carriers is determined as a change in short circuit current density, JSC, between steps (a) and (b); and (d) using the changes determined in step (c) to calculate said efficiency measure, thereby values of Pin and JSC are used to calculate a value of the incident photon to charge carrier efficiency (IPCE).

2. A method according to claim 1, in which step (c) is conducted by:

(i) measuring the an intensity Pin,1 of the broadband light source in step (a) and an intensity Pin,2 of the broadband light source of which the intensity of a selected range of wavelengths has been reduced in step (b);

(ii) measuring a short circuit current density JSC,1 of the solar cell when illuminated by the broadband light source in step (a) and a short circuit current density JSC,2 of the solar cell when illuminated by the broadband light source of which the intensity of a selected range of wavelengths has been reduced in step (b);

(iii) comparing the values of Pin,1 with Pin,2 and JSC,1 with JSC,2 in order to arrive at the values of Pin and JSC due to the change in intensity of the selected wavelength range.

3. A method according to claim 1, in which the intensity of the selected range of wavelengths in step (b) is modulated using a selected waveform at a selected frequency, and step (c) is conducted by determining the modulated light intensity function Pin,m and the corresponding modulated short circuit current density function JSC,m.

4. A method according claim 1, wherein the broadband source comprises an array of light sources providing light of different wavelength ranges, and the intensity of the selected wavelength range is reduced by switching off the light sources providing light of the selected wavelength range.

5. A method according to claim 1, wherein the broadband source comprises an array of light sources providing light of different wavelength ranges, and the intensity of the selected wavelength range is reduced by reducing the intensity of the light sources providing light of the selected wavelength range.

6. A method according to claim 5, wherein the reduction in intensity of the selected wavelength range in step (d) is to 50% of the intensity of the selected wavelength range in step (a).

7. A method according to claim 5, wherein the reduction in intensity of the selected wavelength range in step (d) is to 75% of the intensity of the selected wavelength range in step (a).

8. A method according to claim 5, wherein the reduction in intensity of the selected wavelength range in step (d) is to 90% of the intensity of the selected wavelength range in step (a).

9. A method according to claim 5, wherein the reduction in intensity of the selected wavelength range in step (d) is to 95% of the intensity of the selected wavelength range in step (a).

10. A method according to claim 1, wherein the selected range of wavelengths has a maximum FWHM range of 50 nm.

11. A method according to claim 1, wherein the selected range of wavelengths excluded from the broadband source has a maximum FWHM range of 40 nm.

12. A method according to claim 1, comprising a further step before step (a) in which the broadband source is adjusted to simulate the spectrum of a chosen light source, preferably the sun.

13. A method according to claim 1, wherein illuminating the solar cell with the broadband light source comprises illuminating an organic solar cell or a dye sensitized solar cell, or both with the broadband light source.

* * * * *